9/19/86 OR 4,606,600

United States Patent [19]

Schmidt

[11] Patent Number: 4,606,600

[45] Date of Patent: Aug. 19, 1986

[54] PASSIVE INFRARED MOVEMENT DETECTOR

[75] Inventor: Bernd Schmidt, Solingen, Fed. Rep. of Germany

[73] Assignee: Inovatronic elektronische Systeme GmbH, Solingen, Fed. Rep. of Germany

[21] Appl. No.: 686,819

[22] Filed: Dec. 26, 1984

[30] Foreign Application Priority Data

Jan. 3, 1984 [DE] Fed. Rep. of Germany ....... 3400067

[51] Int. Cl.[4] .............................................. G02B 5/132

[52] U.S. Cl. ..................................... 350/1.1; 350/107

[58] Field of Search ................................ 350/1.1, 107

[56] References Cited

FOREIGN PATENT DOCUMENTS 2855322 7/1979 Fed. Rep. of Germany .

*Primary Examiner*—Bruce Y. Arnold

*Attorney, Agent, or Firm*—John C. Smith, Jr.

[57] ABSTRACT

In a passive infrared movement detector having a reflector which directs the radiation from a plurality of fields of vision to an infrared detector arrangement and for this purpose consists of a plurality of individual reflectors, the reflecting surface of the reflector is composed of a plurality of facets produced at the reflector. The disadvantages of such a reflector are in particular to be seen in the fact that for each required distance range of the passive infrared movement detector a reflector adapted thereto must be used. Furthermore, the production of such a reflector is relatively expensive. In order to avoid these disadvantages, the individual reflectors are proposed to be in the form of spherical reflectors which are arranged on a reflector carrier in a manner so as to be shiftable in different directions and lockable in adjusted positions.

4 Claims, 2 Drawing Figures

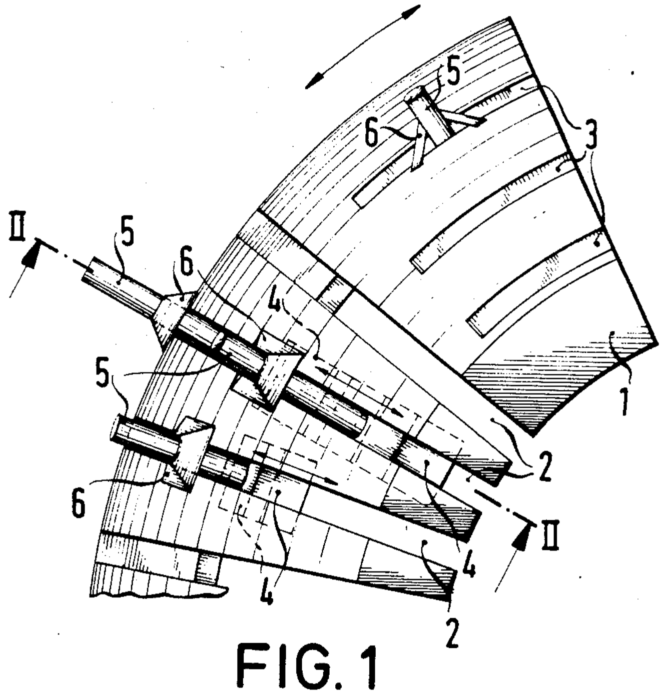
FIG. 1
FIG. 2
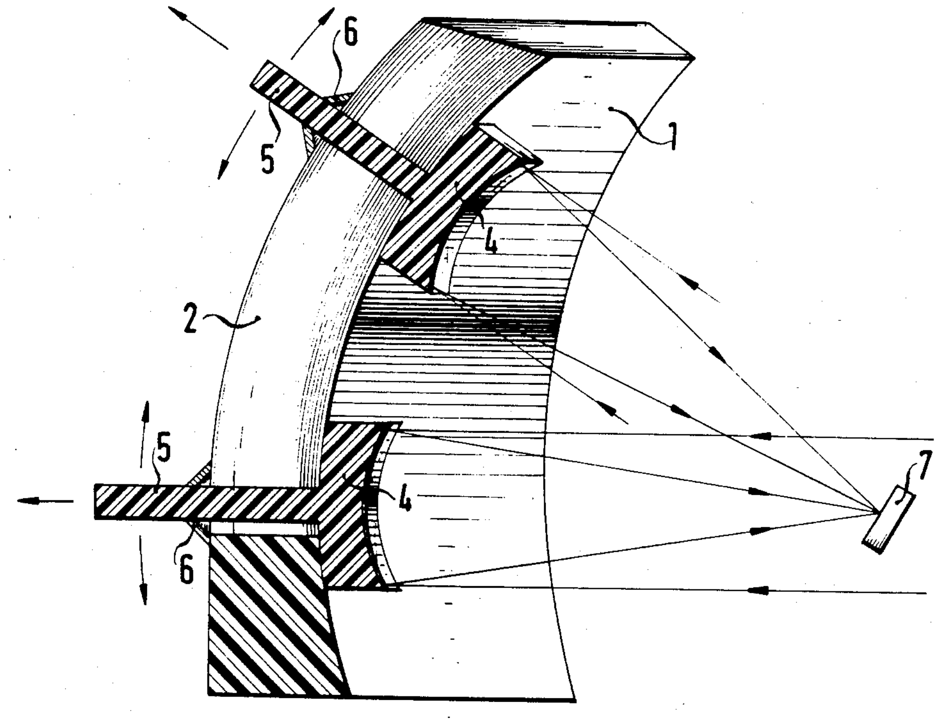

PASSIVE INFRARED MOVEMENT DETECTOR

BACKGROUND OF THE INVENTION

This invention relates to electronic sensors, and more specifically to a passive infrared movement detector having a reflecting device which directs the radiation from a plurality of fields of vision to an infrared detector arrangement and for this purpose consists of a plurality of individual reflectors.

A passive infrared movement detector is known from German Offenlegungsschrift No. 28 55 322. The reflecting surface of the reflector described therein is composed of a plurality of facets produced at the reflector. Movement detectors having such a reflector have essential disadvantages which are as follows: For each required range of action of the movement detector a reflector adapted thereto must be used, since the range of action of the movement detector is determined by the dimensions of the facets and, therefore, is invariable. Because the reflecting surface of the reflector is made in one piece, it is necessary, in the case when after the installation of the apparatus a source of errors is present in one of the coverages, to change the position of the whole apparatus in order to eliminate this source of errors. Thereby, it cannot be excluded that after the adjustment of the apparatus has been carried out, sources of errors become noticeable in other coverages which can only be eliminated by a further adjustment of the apparatus. Furthermore, an optimum surveillance becomes doubtful by the fact that by an adjustment of the movement detector by means of one facet of the reflector all other facets are compulsorily also adjusted. Finally, due to the plurality of facets to be produced, the production of the reflecting surface of the reflector is difficult and thus expensive.

SUMMARY OF THE INVENTION

It is therefore the object of the present invention to avoid the above-mentioned disadvantages and to construct a passive infrared movement detector in such a manner that an optimum surveillance is made possible, its range of action can be varied without difficulties and sources of errors in the monitored regions can be eliminated without the need of renewed adjustment of the passive infrared movement detector.

To attain this object the present invention provides a passive infrared movement detector having a reflector which directs the radiation from a plurality of fields of vision to an infrared detector arrangement and for this purpose consists of a plurality of individual reflectors, wherein the individual reflectors of the passive infrared movement detector are spherical reflectors which are separately arranged on a reflector carrier so as to be shiftable in different directions.

The passive infrared movement detector proposed by the invention makes possible an optimum surveillance of for example a room, in that the individual spherical reflectors are directed to the places to be monitored. The apparatus need not be readjusted once more. If certain regions are not to be monitored, the corresponding spherical reflectors may be directed to other places or removed from the reflector carrier. The range of action of the reflector can be varied in a simple manner by exchanging the spherical reflectors. The spherical reflectors can be produced substantially cheaper as compared with a reflector the faceted reflecting surface of which is made in one piece.

In an advantageous development of the passive infrared movement detector, each spherical reflector possesses an extension at its back side and the reflector carrier has transversely and/or longitudinally extending cutouts by which the extensions of, and thus the spherical reflector, are shiftably guided, the spherical reflectors being lockable in adjusted positions.

This construction is advantageous in so far as the spherical reflectors are not only shiftable in the cutouts of the reflector carrier without efforts but can also be removed in a simple manner from the cutouts.

BRIEF DESCRIPTION OF THE DRAWING

An embodiment of the invention will now be described by way of example and with reference to the accompanying drawing in which:

FIG. 1 is a fragmentary elevational view of a passive infrared movement detector according to the invention, and FIG. 2 is a cross-sectional view along the line II—II of FIG. 1 with two spherical reflectors, wherein the further transversely and longitudinally extending cutouts having been omitted.

DESCRIPTION OF THE PREFERRED EMBODIMENT

FIGS. 1 and 2 show a passive infrared movement detector having a reflector which consists of a reflector carrier 1 and a plurality of individual reflectors in the form of spherical reflectors 4. Each spherical reflector 4 possesses at its back side an extension 5. The reflector carrier 1 is provided with transversely and longitudinally extending cutouts 2 and 3 by which the extensions 5 and thus the spherical reflectors 4 are shiftably guided. The spherical reflectors 4 are secured in their adjusted positions by means of clamps 6. The reference numeral 7 designates an infrared detector arrangement.

The invention may be embodied in other specific forms without departing from the spirit or essential characteristics thereof. The embodiment is therefore to be considered in all respects as illustrative and not restrictive.

What is claimed is:

1. A passive infrared movement detector having a reflector which directs the radiation from a plurality of fields of vision to an infrared detector arrangement and for this purpose consists of a plurality of individual reflectors, wherein the individual reflectors of the passive infrared movement detector are spherical reflectors (4) which are separately arranged on a reflector carrier (1) so as to be shiftable in different directions.

2. A passive infrared movement detector as claimed in claim 1, wherein each spherical reflector (4) possesses an extension (5) at its back side and the reflector carrier (1) has transversely extending cutouts (2) by which the extensions and thus the spherical reflectors are shiftably guided, the spherical reflectors being lockable in adjusted positions.

3. A passive infrared movement detector as claimed in claim 1, wherein each spherical reflector (4) possesses an extension (5) at its back side and the reflector carrier (1) has longitudinally extending cutouts (3) by which the extensions and thus the spherical reflectors are shiftably guided, the spherical reflectors being lockable in adjusted positions.

4. A passive infrared movement detector as claimed in claim 1, wherein each spherical reflector (4) possesses an extension (5) at its back side and the reflector carrier (1) has transversely and longitudinally extending cutouts (2, 3) by which the extensions and thus the spherical reflectors are shiftably guided, the spherical reflectors being lockable in adjusted positions.

* * * * *